United States Patent
Köster

(10) Patent No.: US 11,548,574 B2
(45) Date of Patent: Jan. 10, 2023

(54) SYSTEM AND METHOD FOR PIVOTING A COUPLING COMPONENT

(71) Applicant: SAF-HOLLAND GmbH, Bessenbach (DE)

(72) Inventor: Mario Sebastian Köster, Bodman-Ludwigshafen (DE)

(73) Assignee: SAF-HOLLAND GmbH, Bessenbach (DE)

(*) Notice: Subject to any disclaimer, the term of this patent is extended or adjusted under 35 U.S.C. 154(b) by 245 days.

(21) Appl. No.: 16/982,332

(22) PCT Filed: Mar. 19, 2019

(86) PCT No.: PCT/EP2019/056835
§ 371 (c)(1),
(2) Date: Sep. 18, 2020

(87) PCT Pub. No.: WO2019/180017
PCT Pub. Date: Sep. 26, 2019

(65) Prior Publication Data
US 2021/0031842 A1 Feb. 4, 2021

(30) Foreign Application Priority Data
Mar. 21, 2018 (DE) .............. 10 2018 106 677.5

(51) Int. Cl.
B62D 53/12 (2006.01)

(52) U.S. Cl.
CPC ................ B62D 53/125 (2013.01)

(58) Field of Classification Search
CPC ................ B62D 53/125
See application file for complete search history.

(56) References Cited

U.S. PATENT DOCUMENTS

| 2,480,413 A | * | 8/1949 | Kirksey | B62D 53/125 280/421 |
| 3,941,408 A | * | 3/1976 | Petersson | B60Q 1/305 280/421 |
| 5,346,239 A | * | 9/1994 | Wohlhuter | B62D 53/125 280/422 |

(Continued)

FOREIGN PATENT DOCUMENTS

| DE | 102006033899 A1 | 1/2008 |
| DE | 102006033900 B3 | 7/2008 |

(Continued)

OTHER PUBLICATIONS

European Patent Office; International Search Report; dated Jul. 2, 2019.

Primary Examiner — Jacob D Knutson
Assistant Examiner — Ryan Edward Hardy
(74) Attorney, Agent, or Firm — Price Heneveld LLP

(57) ABSTRACT

A system for pivoting a coupling component for a semi-trailer truck includes a rotation device configured to pivot the coupling component between a primary position and a secondary position, and at least one line, which is guided into the coupling component via the rotation device and wherein the system comprises a pivot arm for entraining the at least one line when the coupling component is pivoted between the primary position and the secondary position.

18 Claims, 3 Drawing Sheets

(56) References Cited

U.S. PATENT DOCUMENTS

| | | | |
|---|---|---|---|
| 7,793,966 B2 * | 9/2010 | Richter | B60D 1/64 280/433 |
| 8,297,638 B2 * | 10/2012 | Alguera | B60D 1/363 280/421 |
| 2006/0054728 A1 * | 3/2006 | Gallego | B65H 75/4449 242/378.1 |

FOREIGN PATENT DOCUMENTS

| | | | | |
|---|---|---|---|---|
| EP | 0084712 A2 | 8/1983 | | |
| WO | WO-9426542 A1 * | 11/1994 | | B60D 1/36 |
| WO | WO-2008009660 A1 * | 1/2008 | | B60D 1/363 |
| WO | WO-2008038313 A1 * | 4/2008 | | B60D 1/62 |

* cited by examiner

SYSTEM AND METHOD FOR PIVOTING A COUPLING COMPONENT

BACKGROUND OF THE INVENTION

The present invention concerns a system and a method for pivoting a coupling component.

The connection of a semi-trailer to a tractor unit is sufficiently well known from the state of the art. For this purpose, the semi-trailer typically has a pin element, in particular a kingpin, which engages in a coupled state in a corresponding fifth wheel coupling, or coupling plate with coupling hook, on the tractor unit. In addition to the mechanical connection of the semi-trailer to the tractor unit, successful coupling of the semi-trailer to the tractor unit also includes the connection of lines on the tractor unit side and on the trailer side, such as air pressure lines and electrical lines which are required to supply the lighting system or other electronics. A coupling component is preferably provided for guiding the lines, in or on which the lines are guided to an interface area provided for the desired connection. This coupling component is preferably pivotally mounted so that the lines for coupling can be easily aligned if the tractor unit and the semi-trailer are at an angle, i.e. not aligned, to each other during coupling. The use of a rotation device, especially in the form of a semi-trailer rotation platform, has become established in this respect.

From DE 10 2006 033 900 B3, a line outlet for a semi-trailer of a semi-trailer truck is known, wherein a frame construction is provided with a semi-trailer plate closing on the underside, on which the kingpin is arranged.

To guide the lines, clamping arms are attached to the frame structure at their outermost end so that they can pivot around a vertical axis.

However, the use of the rotation device and the pivoting of the coupling component put a strain on the lines, the required length of which changes depending on the degree of pivoting.

Based on this background, the present invention has the object to provide an improved system for pivoting the coupling component, with which the lines can be subjected to less stress in the long term, in particular without making substantial structural changes to a pivoting mechanism provided for the coupling component.

SUMMARY OF THE INVENTION

A system for pivoting a coupling component, in particular an outrigger, for a semi-trailer truck, comprising a rotation device by means of which the coupling component can be pivoted between a primary position and a secondary position for its alignment, and at least one line which is guided into the coupling component via the rotation device, wherein the system comprises a pivot arm for entraining the line when the coupling component is pivoted between the primary position and the secondary position. Contrary to the state of the art, a pivot arm is provided in accordance with the invention, which, in addition to being guided by the coupling component, entrains when the coupling component is pivoted between the primary position and the secondary position. The additional guidance allows the movement of the cable, especially when returning to the primary position, to be additionally controlled and the alignment of the cable to be carried out more gently. It is preferably intended that the rotation device is embedded in a vehicle frame, in particular a floor plate, of the semi-trailer. Here, the coupling component is mounted on the rotation device on a side facing a roadway, while the pivot arm is mounted on an upper side of the vehicle frame opposite the underside. The coupling component of the vehicle frame thus ensures that the line is guided on the underside, while the pivot arm guides the line on the upper side of the vehicle frame. The line passes through the rotation device in order to be guided from the top side with the pivot arm to the bottom side with the coupling component. In principle, lines are all lines used to supply the semi-trailer, such as electrical or pneumatic lines. This can be a single line or preferably a bundle of lines. The lines also end in the coupling component in a plug console or socket, which is designed for coupling with a complementarily designed further plug console or socket on the semi-trailer. Furthermore, it is provided that a longitudinal axis of the coupling component in the primary position runs essentially parallel to a central axis of the semi-trailer and, for example, in a secondary position is inclined or twisted by up to 90° or even up to 120° relative to the central axis. Furthermore, it is preferably provided that a pin element, in particular a kingpin, is arranged in the centre of the rotation device, around which the coupling component is mounted so as to be pivotable about an axis of rotation. The pin element is used to mechanically couple the semi-trailer to the tractor unit. Furthermore, it is preferably provided that the plug console is aligned with the pin element and the coupling component is preferably arranged in the primary position behind the pin element, viewed in the direction of travel. Furthermore, it is conceivable that the line or lines are fixed to the pivot arm by means of one or more fastenings or fastening eyes, for example at regular intervals. In particular, it is conceivable that the pivoting of the coupling component and the pivoting of the pivot arm are coupled with each other, in particular coupled with each other via the rotation device. For example, the coupling component and the pivot arm are both connected to the rotation device, so that during rotation by the rotation device both the coupling component and the pivot arm are equally pivoted or rotated.

Preferably the pivot arm has a hollow body area, in which preferably at least partly the line is arranged. This allows the lines to be arranged preferably protected in the hollow body area and are carried along when the pivot arm is pivoted.

It is expedient that the line is dimensioned in such a way that it is arranged stress-free in the hollow body area in the primary position and the secondary position and in particular for each alignment of the coupling component between the primary position and the secondary position. Preferably, the cable is dimensioned so long that it runs within the hollow body area without overstressing at the maximum deflection provided for the secondary position. For example, at a maximum deflection, the coupling component is pivoted up to 120°, preferably up to 90°, relative to the primary position. It is conceivable that the lines in the hollow body area are buckled or run within the hollow body area by forming loops or bows or wave-like. In this way, the required change in length within the cavity area caused by the pivot movement can be controlled. It is therefore advantageous to dispense with a device that compensates the required change in length with a corresponding mechanism.

In particular, it is provided that in an assembled state the pivot arm is mounted in a first area sliding and/or pivotably on a vehicle frame, preferably on a support element, and in a second area is pivotably connected to the rotation device. Preferably the pivot arm is connected to the rotation device in the manner of a crank.

Preferably, the pivot arm is pivotally connected to the rotation device in a second area or the pivot arm is slidably mounted in a first area.

Preferably it is provided that the pivot arm has at least one joint. This allows the pivot arm to be bent in an advantageous way, for example, when it comes to a stop with a lateral limit. In this way the pivot arm does not limit the maximum deflection of the tractor unit compared to the semi-trailer. Instead, the pivot arm can bend off and a further rotation of the semi-trailer in relation to the tractor unit is still possible. In addition, it is possible to provide a system that is economical with respect to space in which there is no need to keep space available to provide the pivot arm with the space it needs for movement. For example, the joint is arranged or designed between the first and the second area.

Furthermore, it is conceivable that the pivot arm is aligned in its longitudinal extension diagonally, i.e. not parallel, to the roadway or to a base plate of the vehicle. For example, the pivot arm is made of a metal, a plastic or a carbon fibre reinforced plastic. It is also conceivable that the pivot arm is open to at least one side. This makes it possible, for example, to have simple and direct access to the lines carried in the pivot arm, for example when they need to be repaired or maintained. It is also conceivable that the pivot arm has an opening that allows direct access to the lines in the pivot arm. This opening is preferably provided with a closing element that allows the interior of the cavity to be protected from environmental influences. If necessary, e.g. for repair or maintenance, the inside of the cavity can be accessed when the closing element is removed or folded away.

The system advantageously has a spring element for returning the pivot arm from the secondary position to the primary position, the spring element preferably being arranged between the first area and the second area. Several spring elements are conceivable, for example. In particular, the spring element is mounted or arranged in such a way that it is tensioned when the rotation device is transferred from the primary position to the secondary position. Preferably the spring element has no preload in the primary position. However, it is also conceivable that the spring element is preloaded in the primary position, wherein in particular the preload in the primary position is smaller than in the secondary position or for the deflections between the primary position and the secondary position, so that an automatic return to the primary position can be ensured. It is particularly preferred that a displacement of the pivot arm during the transfer from the primary position to the secondary position can be used to tension the spring element. Alternatively, it is also conceivable that the spring element is connected to the rotation device at one end and to the vehicle frame at the other end. In particular, it is envisaged that the spring element is connected to the pivot arm and to a fixed point on the vehicle.

In particular, the spring element is connected with one end to a support element through which the pivot arm is passed. The support element pivots with the rotation of the pivot arm and thereby provides sufficient support for the spring element. Preferably the spring element is connected to the pivot arm with its other end. In particular, when the pivot arm is moved, the distance between the first end and the second end is then shortened, thus pretensioning the spring element. Compression and/or tension springs are conceivable, for example. This allows the support element to be located on the same side of the pivot element as the rotation device. Accordingly, the distance can be increased and the spring can be tensioned in the event of deflection.

Advantageously, the spring element is designed as a spiral spring, which preferably embraces the pivot arm. This is an advantageous way to design the spring element in a particularly space-saving way.

It is useful for the rotation device to comprise a disc-shaped turntable rotatable about an axis of rotation, an opening being provided in the turntable at a distance from the axis of rotation for the passage of the line. Via the opening, the line can advantageously be arranged both above and below the vehicle frame, in particular a base plate of the vehicle frame. It is preferable to arrange as much of the line as possible above the vehicle frame in order to prevent the line from getting caught underneath the vehicle frame between the pivot element and the fifth wheel of the tractor unit when coupling.

Preferably, a ratio of the distance of the opening to the axis of rotation to a radius of the turntable assumes a value between 0.25 and 0.78, more preferably between 0.3 and 0.65 and most preferably between 0.35 and 0.45. It is therefore advantageous to guide the line through the rotary device, in particular the turntable, at a sufficiently large distance from the pin element without the required excess length for the line becoming too large as the distance to the axis of rotation increases.

It is advisable for the line to extend at least partially in the pivot arm up to the opening on an upper side of the vehicle frame facing away from a roadway, while the coupling component guides the line on the underside of the vehicle frame opposite the upper side below the opening. In this way, the line can be guided on both the upper and lower sides accordingly. In particular, it is intended that the line is guided in the area of the rotation device in order to prevent the line from restricting or even obstructing the functionality of the rotation device. The pivot arm is preferably designed above the opening in such a way that it provides a free area for the cables. The free area can be used, for example, to accumulate excess line lengths that are required for length compensation of the line when transferring between the primary and secondary positions.

In particular, the opening in the primary position, viewed in the direction of travel, is arranged behind a pin element for coupling a semi-trailer to a tractor unit. This has the advantage of preventing the line from being positioned between the pin element and the fifth wheel coupling of the tractor unit in the primary position when coupling. Preferably the opening in the primary position is arranged on a central axis of the semi-trailer.

Preferably, a ratio between a radius of the turntable and a length of the pivot arm measured in the longitudinal direction of the pivot arm assumes a value between 0.25 and 0.8, more preferably between 0.35 and 0.65 and most preferably between 0.45 and 0.55. It is thus advantageous to ensure that the cable is guided by the pivot arm above the rotary device, in particular above the turntable.

It is expedient for the pivot arm to be designed telescopic, wherein the pivot arm changes in particular its length when the coupling component is pivoted between the primary position and the secondary position. Thus, for example, the pivot arm can be designed in such a way that it does not protrude beyond the first area, i.e. the pivot arm extends only up to the first area and is supported, for example, with its one end on the support element. In order to ensure that the line between the first area and the second area is guided by the pivot arm, regardless of the orientation of the coupling component, the length of the pivot arm can be varied accordingly.

A further object of the present invention is a method for pivoting a coupling component, in particular an outrigger, wherein a rotation device, by means of which the coupling component can be pivoted between a primary position and a secondary position, and at least one line, which is guided into the coupling component via the rotation device, are provided, wherein a pivot arm for guiding the line is pivoted between the primary position and the secondary position when the coupling component is pivoted. All features described for the system according to the invention and their advantages can also be transferred analogously to the method according to the invention and vice versa.

DETAILED DESCRIPTION OF THE PREFERRED EMBODIMENTS

Figure 1A:
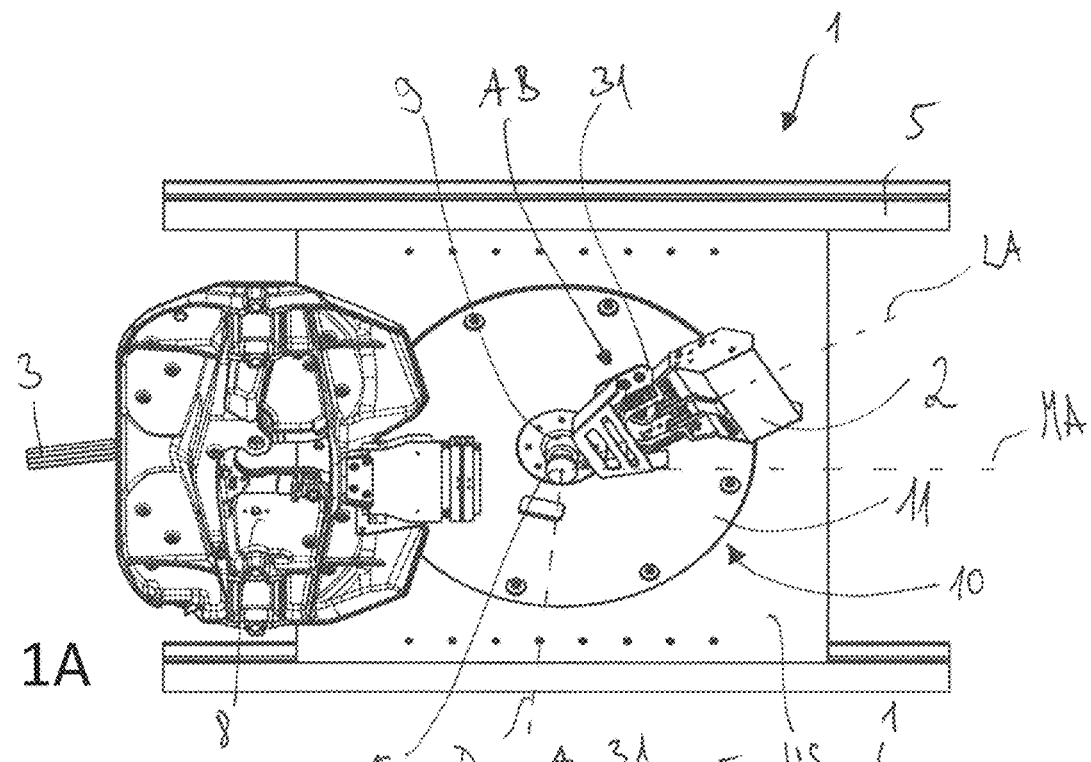
FIG. 1A is a top perspective view of a system for pivoting a coupling component for a coupling between an semi-trailer truck and a semi-trailer according to a preferred embodiment.

FIGS. 1A to 3 show a system 1 for pivoting a coupling component 2 according to a preferred embodiment of the present invention. The coupling component 2, in particular an outrigger, is used for coupling between a tractor unit and a semi-trailer in an interface area. In particular, FIGS. 1A to 3 show a state in which the semi-trailer and the tractor unit are not yet coupled to each other. An interface area between the tractor unit and the semi-trailer means in particular the area in which the semi-trailer is connected to the tractor unit, preferably automatically. For example, the semi-trailer is connected to the tractor unit via a trailer-side pin element 6, which engages in a tractor unit-side fifth wheel 8 when coupled. In addition to the mechanical coupling, it is also necessary that trailer-side and tractor-side lines 3 or supply lines, such as a gas pressure line or air pressure line or an electrical line, can be connected to each other via a corresponding plug or connection mechanism in the interface area. The coupling component 2 is used to guide the lines 3 and to align them when coupling, in particular on the underside of a vehicle frame 5 of the semi-trailer facing the vehicle track. Preferably, the vehicle frame comprises plate elements, in particular a base plate, and/or web-shaped struts. For the guidance and alignment of the lines 3, these are connected to the coupling component 2 on the inside or outside and the coupling component has, for example, a plug socket or console 52 into which the lines on the trailer end. The plug socket or console 52 is used to connect the lines 3 to a complementary plug socket or console 51 on the tractor unit (see FIG. 3). The coupling component 2 is essentially fork-shaped and has, for example, longitudinal struts, cross struts and/or closed sheet metal areas which serve to stabilize the coupling component and on which the lines can be guided and mounted. In the embodiment shown, the plug socket or console 52 is arranged on the coupling component 2 in such a way that the plug socket or console 52 is directed towards the pin element 6 regardless of the alignment of the coupling component 2.

Figure 1B:
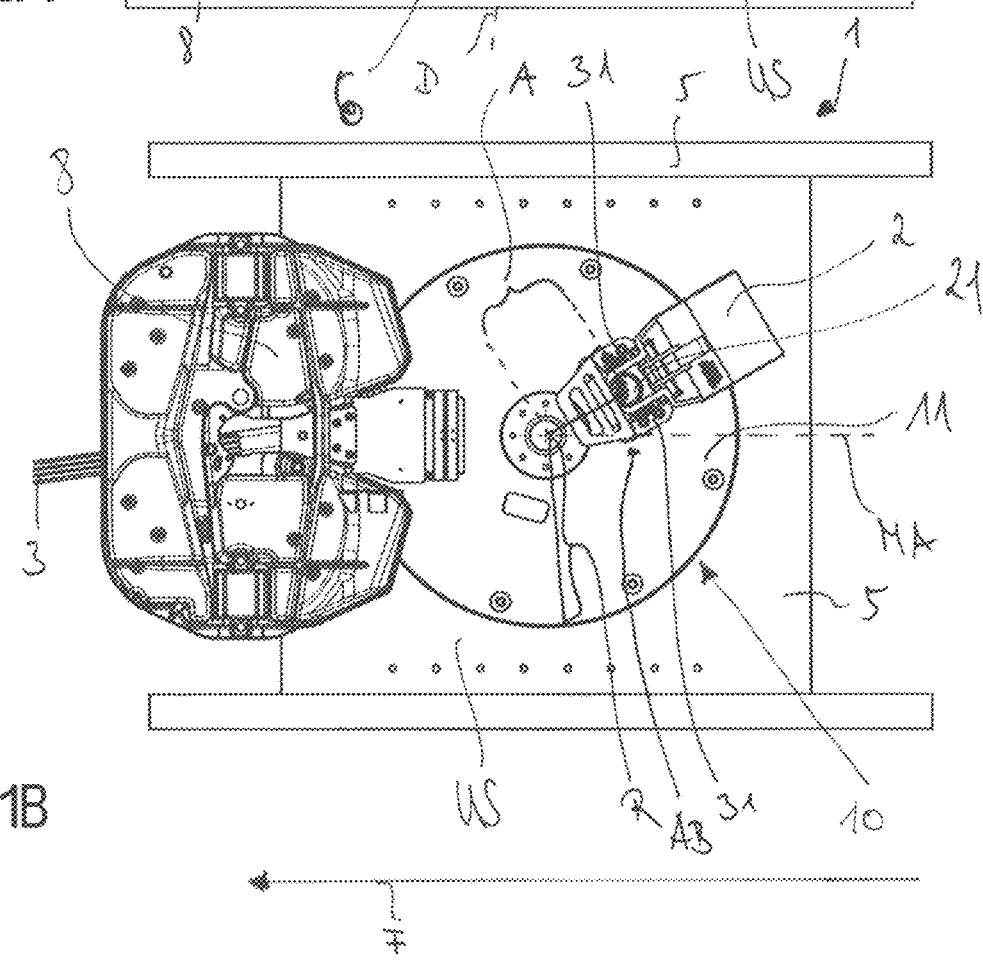
FIG. 1B is a top plan view of the system.
Figure 2A:
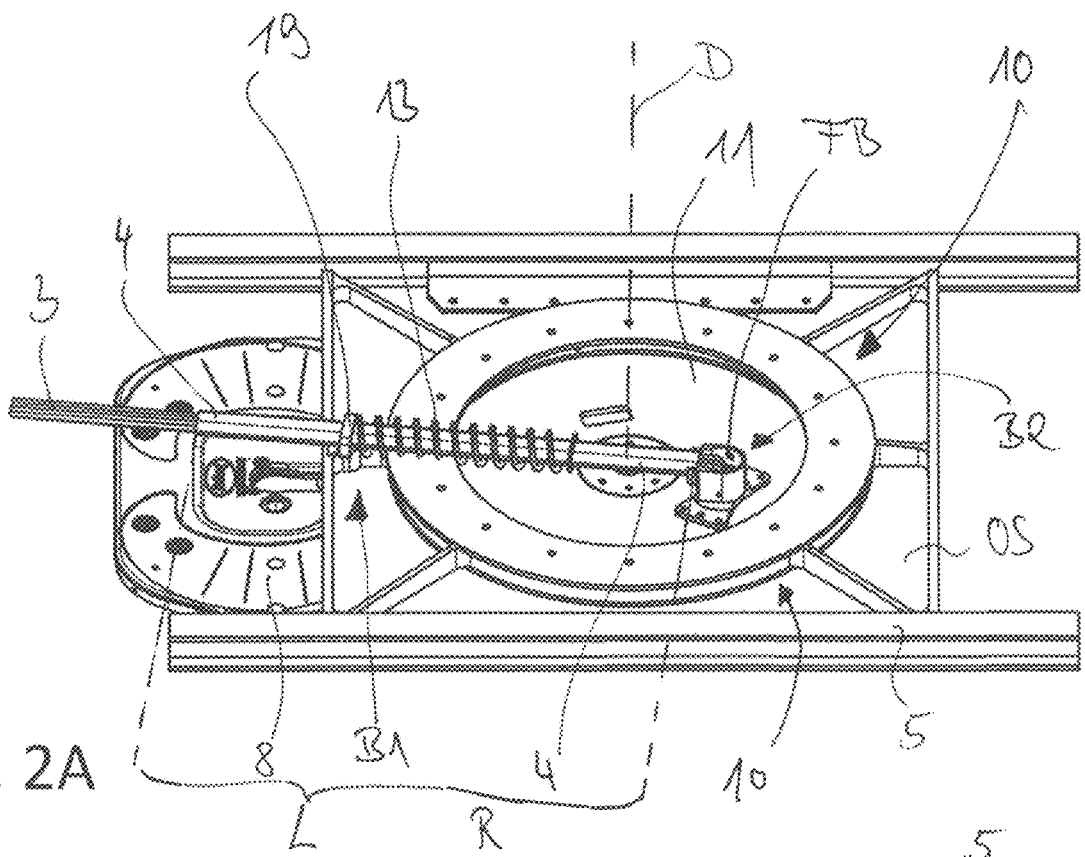
FIG. 2A is a bottom perspective view of the system for pivoting a coupling component for a coupling between a semi-trailer truck and a semi-trailer as shown in FIGS. 1A and 1B.
Figure 2B:
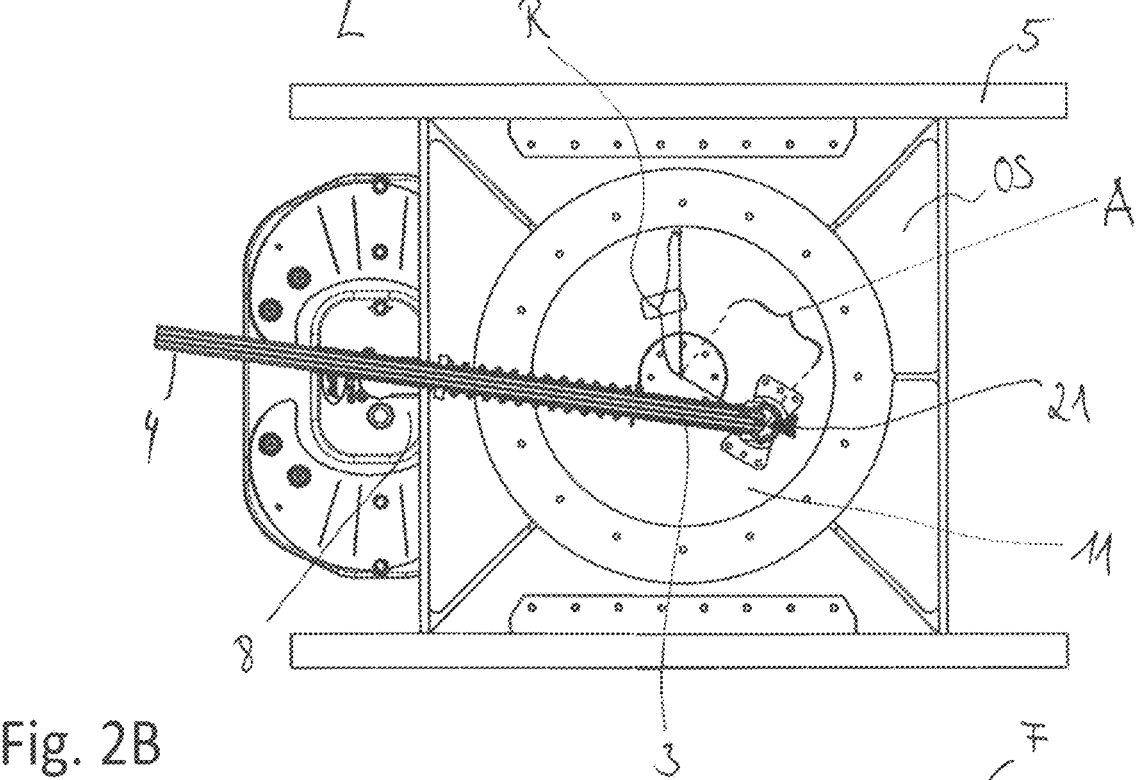
FIG. 2B is a bottom plan view of the system.
Figure 3:
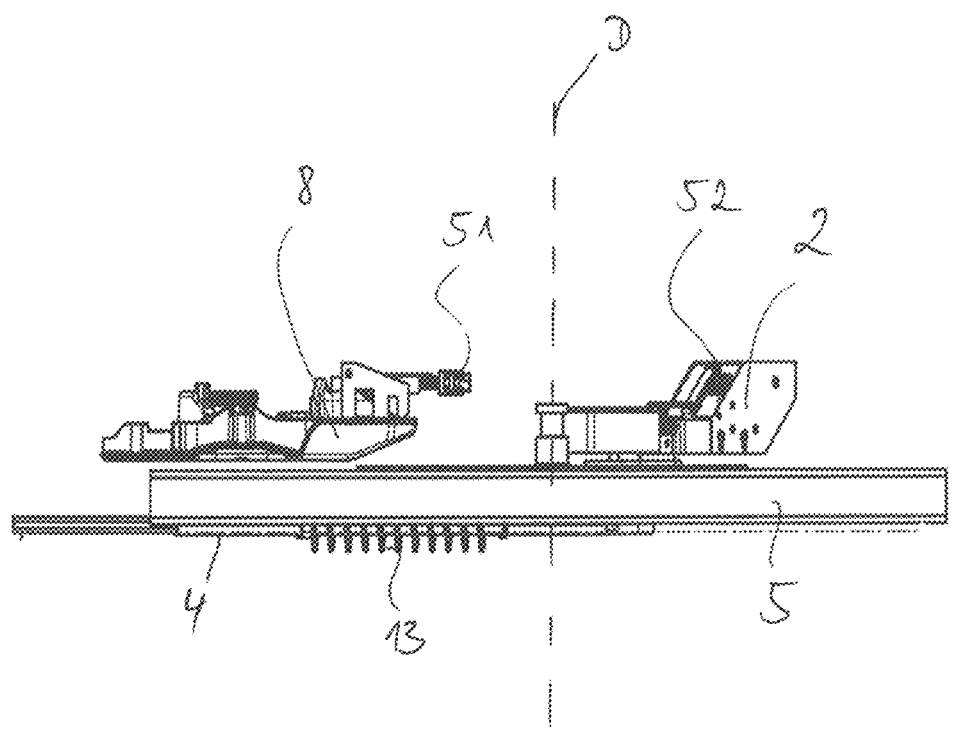
FIG. 3 is a sectional side elevation view of the system from FIGS. 1A-2B.

To align the coupling component 2, in particular when coupling the semi-trailer to the tractor unit, it is provided that the coupling component 2 can be pivoted between a primary position and a secondary position. The primary position preferably corresponds to a rest position in which a longitudinal axis LA of the coupling component 2 runs substantially parallel to a central axis MA of the semi-trailer. In the secondary position, the longitudinal axis LA of the coupling component is, for example, inclined or twisted up to 90° or even up to 120° with respect to the central axis MA. FIGS. 1 to 3 show the coupling component in a possible secondary position.

For pivoting between the primary position and the secondary position, in particular a rotation device 10 is provided, to which the coupling component 2 is connected in a rotationally fixed manner. The rotation device 10 comprises in particular a disc-shaped turntable 11, which is embedded in a vehicle frame 5 and is mounted so as to be rotatable about an axis of rotation D. The pin element 6 is arranged in the centre of the turntable 11 and is positioned opposite the turntable 11 in the direction of the roadway, i.e. downwards, or stands off from the underside US of the vehicle frame 5. The coupling component 2 is connected to the turntable 11, in particular at an underside US, i.e. a side of the semi-trailer facing the roadway, in such a way that the coupling component 2 is also pivoted when the turntable 11 rotates. Preferably, the coupling component 2 is connected to the underside of the turntable 11 via flanges 31 in a connection area AB, whereby the connection area AB is offset radially outwards relative to the axis of rotation in relation to the pin element 6. In the example illustrated in the figures, the coupling component 2 is additionally rotatably connected to pin element 6 via a sleeve or a cup seal 9.

In order to prevent the lines 3 on the underside US from hindering a connection to the fifth wheel 8, it is intended that the lines 3 are guided on the upper side OS of the vehicle frame 5 facing away from the roadway up to an opening 21. The lines 3, which are guided up to the opening 21, then pass through the opening 21 and thus reach the coupling component 2 located below the opening 21, which is mounted on the underside of the rotation device 10 opposite the upper side OS. Preferably, the opening 21 is located in the primary position in an area behind the pin element 6, seen in the direction of travel F (forward travel). This has the advantage, for example, of reducing the probability that the line 3 can enter the area between the pivot element 6 and the fifth wheel 8 of the tractor unit when coupling.

In particular, it is provided that the opening 21 is arranged at a distance A from the pin element 6, through which the axis of rotation D preferably passes centrally, a ratio of the distance A to a radius R of the turntable 11 having a value between 0.25 and 0.78, more preferably between 0.3 and 0.65 and most preferably between 0.35 and 0.45. This allows the opening 21 to be sufficiently distanced from the central pin element 6 and at the same time keeps the required change in length during twisting as small as possible.

On the upper side OS of the vehicle frame 5 it is intended that the line 3 to the opening 21 is guided by means of a pivot arm 4. This means that while the line 3 is routed on the underside US away from the opening 21 to the connector console 52, the line 3 is routed by means of the pivot arm 4 on the upper side OS of the vehicle frame 5. For this purpose, the pivot arm 4 extends up to the opening 21. In particular, it is intended that the pivot arm 4 extends up to an edge of opening 21 when the rotation device 10 is aligned in the primary position. Preferably the pivot arm 4 is connected to the vehicle frame 5 in a first area B1 in a pushable and/or pivotable manner to the vehicle frame 5, while the pivot arm 4, preferably with one of its ends, is connected in a second area B2 in a pivotable manner, for example via a joint element, to the turntable 11, in particular to an upper side of the turntable 11. It is preferably provided that the pivot arm 4 comprises a hollow body area in which the line 3 can be guided at least in some areas. Furthermore, it is provided that in a direction perpendicular to the direction of travel F or perpendicular to the roadway, a free area FB can be found in the pivot arm above the opening. The cables are exposed in the free area FB. Preferably the lines in the free area FB and/or in the hollow body area provide a storage space into which the line can be immersed in the primary position, if necessary forming a loop to provide a reservoir which is required for a length surplus of the line 3 for deflection into the secondary position. In other words: in the free area FB and/or cavity, the excess lengths of line required for the pivot movement of the coupling components are collected in a targeted manner. This ensures with advantage that the required excess length in the primary position is collected or concentrated on the upper side OS of the vehicle frame 5. Conversely, loop formation in the lane below the vehicle frame 5 can be reduced or avoided.

Furthermore, a spring element 13 is provided, with which the turntable 11 can be transferred from the secondary position to the primary position. In particular, the spring element 13 is arranged between the first area B1 and the second area B2 and is designed, for example, as a spiral spring which embraces the pivot arm 4. Preferably the spring element 13 extends between the first area B1 and the second area B2 over a length which is greater than half the distance between the first area B1 and the second area B2. The spring element 13 is designed or configured in such a way that the spring element 13 is preloaded when the turntable 11 is transferred from the primary position to the secondary position. This preload has a restoring effect on the turntable 11 when no further external force is applied to the rotation device 10 or the turntable 11. For this purpose, the spring element 13 is preferably supported in the first area B1 or is arranged on the side facing the first area B1 between the first area B1 and the second area B2. In particular, the pivot arm 4 is supported in the first area B1 in a rotatable support element 19, for example a sleeve or cup seal. The pivot arm is displaceably mounted in this support element. Furthermore, it is preferably provided that the spring element is supported by the support element.

Furthermore, the ratio of the radius R of the turntable 11 to a length L of the pivot arm 4 measured in the longitudinal direction of the pivot arm 4 assumes a value between 0.25 and 0.8, preferably between 0.35 and 0.65 and more preferably between 0.45 and 0.55.

1 System
2 Coupling component
4 Pivot arm
5 Vehicle frame
6 Pin element
8 Fifth wheel
9 Cup seal
10 Rotation device
11 Turntable
13 Spring element
19 Support element
21 Opening
31 Flange
51 Further plug console
52 Plug console
AB Connection area
US Underside
OS Upper side
B1 First area
B2 Second area
D Axis of rotation
F Direction of travel
FB free area
L Length
R Radius
A Distance
LA Longitudinal axis
MA Central axis

The invention claimed is:

1. A system for pivoting a coupling component for a semi-trailer tractor, comprising:
a rotation device configured to pivot the coupling component between a primary position and a secondary position; and
at least one line configured to be guided via the rotation device into the coupling component;
a pivot arm configured to entrain the at least one line when the coupling component is pivoted between the primary position and the secondary position;
wherein the pivot arm is configured to telescope;
wherein the pivot arm changes a length of the pivot arm when the coupling component is pivoted between the primary position and the secondary position;
wherein the rotation device comprises a disc-shaped turntable rotatable about an axis of rotation; and
wherein an opening for the passage of the at least one line is recessed in the turntable at a distance from the axis of rotation.

2. The system according to claim 1, wherein the pivot arm has a hollow body area in which the at least one line is at least partially arranged.

3. The system according to claim 2, wherein the at least one line is configured to be arranged stress-free in the hollow body area in the primary position and the secondary position.

4. The system according to claim 1, wherein in an assembled state the pivot arm is slidably and/or pivotably mounted on a support element of a vehicle frame in a first area, and pivotably connected to the rotation device in a second area.

5. The system according to claim 4, further comprising:
a spring element configured to return the pivot arm from the secondary position to the primary position, the spring element being arranged between the first area and the second area.

6. The system according to claim 5, wherein the spring element is connected with one end to the support element through which the pivot arm is passed.

7. The system according to claim 6, wherein the spring element comprises a spiral spring which embraces the pivot arm.

8. The system according to claim 7, wherein the at least one line extends up to the opening on an upper side of the vehicle frame facing away from a roadway and the coupling component is configured to guide the at least one line on the underside of the vehicle frame opposite the upper side below the opening.

9. The system according to claim 7, wherein the opening in the primary position, viewed in the direction of travel, is arranged behind a pin element for coupling a semi-trailer to a tractor unit.

10. The system according to claim 1, wherein a ratio of the distance of the opening to the axis of rotation to a radius of the turntable is between 0.25 and 0.78.

11. The system according to claim 10, wherein the ratio is between 0.3 and 0.65.

12. The system according to claim 11, wherein the ratio is between 0.35 and 0.45.

13. The system according to claim 10, wherein a ratio between a radius of the turntable and a length of the pivot arm measured in the longitudinal direction of the pivot arm is between 0.25 and 0.8.

14. The system according to claim 13, wherein the ratio between the radius of the turntable and the length of the pivot arm is between 0.35 and 0.65.

15. The system according to claim 14, wherein the ratio between the radius of the turntable and the length of the pivot arm is between 0.45 and 0.55.

16. The system according to claim 1, wherein the coupling component comprises an outrigger.

17. A method for pivoting a coupling component, comprises:
    providing a rotation device configured to pivot the coupling component between a primary position and a secondary position; and
    providing at least one line configured to be guided via the rotation device into the coupling component;
    wherein a pivot arm for guiding the ate least one line is pivoted between the primary position and the secondary position when the coupling component is pivoted;
    wherein the pivot arm is configured to telescope;
    wherein the pivot arm changes a length of the pivot arm when the coupling component is pivoted between the primary position and the secondary position;
    wherein the rotation device comprises a disc-shaped turntable rotatable about an axis of rotation; and
    wherein an opening for the passage of the at least one line is recessed in the turntable at a distance from the axis of rotation.

18. The method of claim 17, wherein the coupling component comprises an outrigger.

* * * * *